United States Patent [19]

Ukai et al.

[11] Patent Number: 4,706,977
[45] Date of Patent: Nov. 17, 1987

[54] STEERING DEVICE FOR FRONT AND REAR WHEELS

[75] Inventors: Norio Ukai; Akira Iwasaki, both of Saitama, Japan

[73] Assignee: Honda Giken Kogyo Kabushiki Kaisha, Tokyo, Japan

[21] Appl. No.: 922,040

[22] Filed: Oct. 21, 1986

[30] Foreign Application Priority Data

Oct. 25, 1985 [JP] Japan .......................... 60-164615[U]
Oct. 25, 1985 [JP] Japan .......................... 60-164617[U]

[51] Int. Cl.$^4$ .............................................. B62D 7/00
[52] U.S. Cl. ..................................... 280/91; 180/140; 180/148
[58] Field of Search ................... 280/91; 180/140, 148

[56] References Cited

U.S. PATENT DOCUMENTS

| | | | |
|---|---|---|---|
| 4,467,885 | 8/1984 | Furukawa et al. | 180/140 |
| 4,506,899 | 3/1985 | Sano et al. | 280/91 |
| 4,538,824 | 9/1985 | Furukawa et al. | 280/91 |
| 4,546,839 | 10/1985 | Noguchi | 180/148 |
| 4,610,328 | 9/1986 | Kanazawa et al. | 280/91 |
| 4,614,351 | 9/1986 | Sano et al. | 280/91 |

FOREIGN PATENT DOCUMENTS 2124167 2/1984 United Kingdom .

Primary Examiner—John J. Love
Assistant Examiner—Kenneth R. Rice
Attorney, Agent, or Firm—Irving M. Weiner; Joseph P. Carrier; Pamela S. Burt

[57] ABSTRACT

A steering device for steering front and rear wheels of a motor vehicle has a steering gear box for the front wheels and a steering gear box for the rear wheels. The front wheel steering gear box includes a first rack shaft operatively coupled to the front wheels, a first input shaft and an output shaft operatively coupled to the first rack shaft. The rear wheel steering gear box includes a second rack shaft operatively coupled to the rear wheels and a second input shaft operatively coupled to the second rack shaft. The output shaft and the second input shaft are interconnected by a linkage shaft. The second input shaft has an end inserted into the rear wheel steering gear box and inclined downwardly. The rear wheel steering gear box is supported on the vehicle frame for tilting movement around the second rack shaft.

6 Claims, 5 Drawing Figures

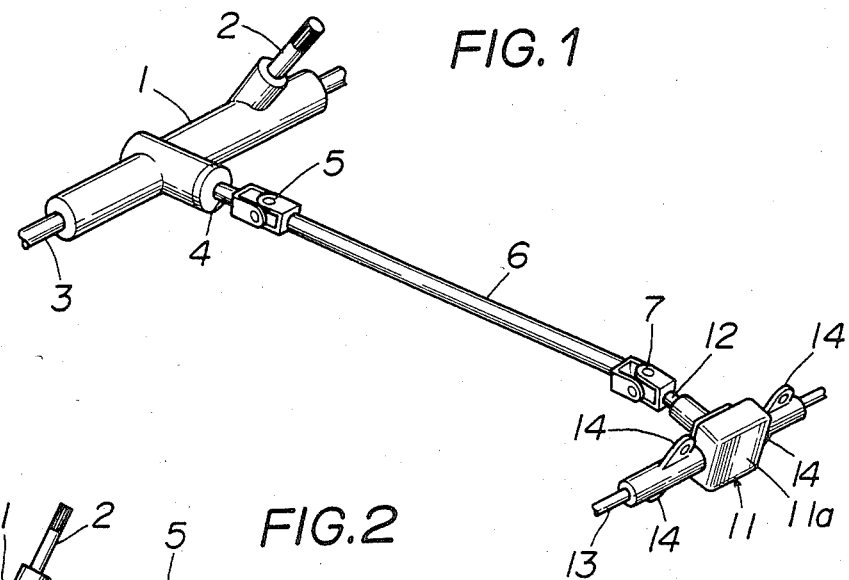
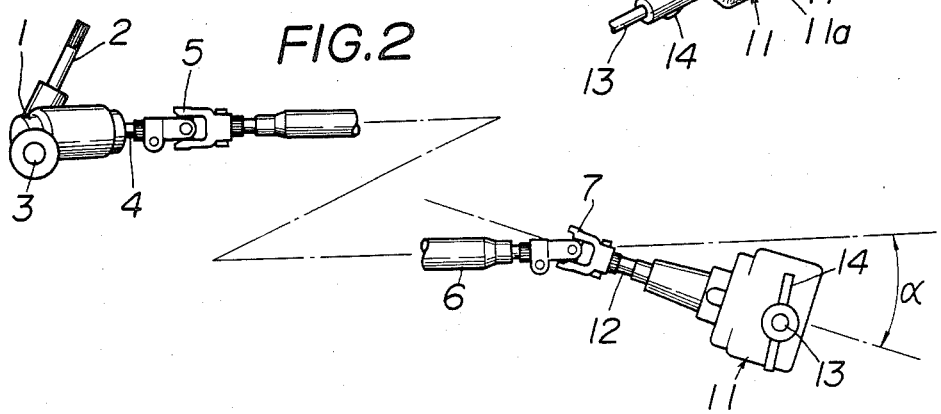
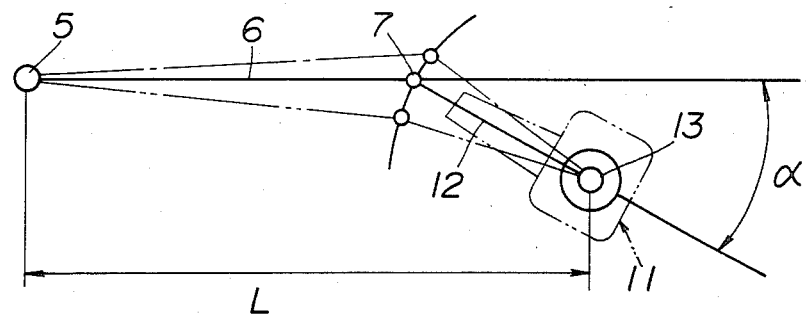

STEERING DEVICE FOR FRONT AND REAR WHEELS

BACKGROUND OF THE INVENTION

1. Field of the Invention

The present invention relates to a steering device for front and rear wheels, and more particularly to a steering device for steering front and rear wheels through rack-and-pinion steering gear boxes disposed in front and rear positions on a motor vehicle frame.

2. Description of the Relevant Art

Various steering devices for steering front and rear wheels at the same time have been proposed in the art. One type of such steering device is disclosed in U.S. Pat. Nos. 4,467,885 and 4,538,824, for example. According to the disclosed steering devices, rack-and-pinion steering gear boxes for front and rear wheels are located in front and rear positions, respectively, on a motor vehicle frame, and a linkage shaft is employed to connect the shaft of a rotation output pinion in the front wheel steering gear to the shaft of a rotation input pinion in the rear wheel steering gear.

With the above conventional steering device, however, the distance between the front and rear steering gear boxes tends to vary from vehicle to vehicle due to manufacturing or assembling errors of shafts such as the pinion shafts of the steering gear boxes and the linkage shaft between the steering gear boxes, and such shafts on completed vehicles are liable to move axially under external stresses, resulting in a change in the distance between the front and rear steering gear boxes. It has been customary practice in the past to couple the shaft members to joint members therebetween through splines for thereby absorbing changes in the box-to-box distance in the axial direction of the shaft members.

The present invention has been made to solve the above problem in a different approach than the above customary solution.

SUMMARY OF THE INVENTION

According to the present invention, there is provided a steering device for steering front and rear wheels of a motor vehicle having a vehicle frame, comprising: a first steering gear box disposed in a front portion of the vehicle frame and including a first linearly movable rack shaft operatively coupled to the front wheels, a first input shaft for moving the first rack shaft, and an output shaft rotatable by movement of the first rack shaft; a second steering gear box disposed in a rear portion of the vehicle frame and including a second linearly movable rack shaft operatively coupled to the rear wheels, and a second input shaft rotatable by the output shaft for moving the second rack shaft; and a linkage shaft interconnecting the output shaft and the second input shaft, the second input shaft being coupled to the linkage shaft at an angle with respect thereto as viewed in side elevation, the second steering gear box being supported on the vehicle frame for tilting movement around the second rack shaft.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 1 is a perspective view of a steering device according to the present invention, showing the positional relationship between steering gear boxes for front and rear wheels, pinion shafts extending from the steering gear boxes, and a linkage shaft interconnecting the pinion shafts;

FIG. 2 is a fragmentary side elevational view of the steering device shown in FIG. 1;

FIG. 4 is a schematic side elevational view of the rear wheel steering gear box and the linkage shaft, showing how the steering device of the invention operates.

DETAILED DESCRIPTION OF THE PREFERRED EMBODIMENT

Figure 3:
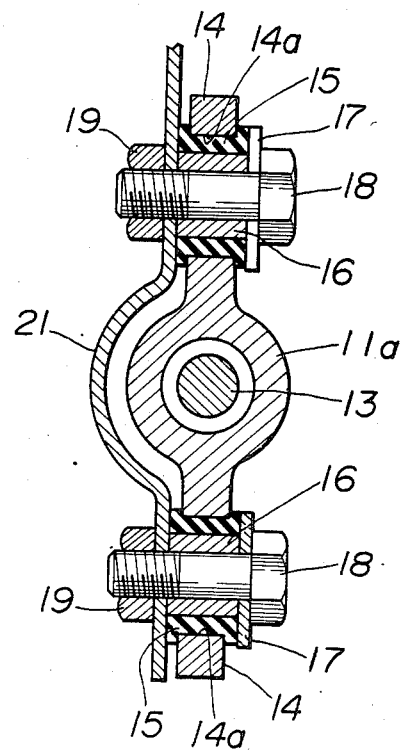
FIG. 3 is an enlarged, vertical, cross-sectional view of the rear wheel steering gear box.

As shown in FIGS. 1 and 2, a steering device for front and rear wheels according to the present invention includes a rack-and-pinion front wheel steering gear box 1 disposed in a front portion of a motor vehicle frame, and a rack-and-pinion rear wheel steering gear box 11 disposed in a rear portion of the motor vehicle frame. The front wheel steering gear box 1 has therein a pinion shaft 2 of a pinion (not shown) to which the rotation of a steering sheel is applied, and a rack shaft 3 including a rack meshing with the pinion. The rack shaft 3, which extends transversely of the motor vehicle frame, has opposite ends coupled to front wheel knuckle arms through respective tie rods, as well known in the art. A rotation output pinion shaft 4 projects rearwardly from the front wheel steering gear box 1, the pinion shaft 4 being coupled to a pinion (not shown) meshing with the rack of the rack shaft 3. To the pinion shaft 4, there is coupled a linkage shaft 6 through a universal joint 5, the linkage shaft 6 extending longitudinally of the motor vehicle frame.

The rear wheel steering gear box 11 includes a housing 11 accommodating therein a rotation input pinion shaft 12 coupled to a pinion (not shown) and at least a portion of a rack or connecting shaft 13 having a rack meshing with the pinion of the pinion shaft 12. The pinion shaft 12 projects forwardly and is coupled through a universal joint 7 to the linkage shaft 6. The rack shaft 13 extending transversely of the motor vehicle frame has opposite ends coupled to rear wheel knuckle arms through respective tie rods, as well known in the art.

As illustrated in FIG. 2, the linkage shaft 6 and the rotation input pinion shaft 12 are coupled to each other by the universal joint 7 at an angle $\alpha$ as viewed in side elevation, so that the pinion shaft 12 is inclined rearwardly at $\alpha$ with respect to the axis of the linkage shaft 6.

The housing 11a of the rear wheel steering gear box 11 has two pairs of upper and lower attachment arms 14 extending radially outwardly of the rack shaft 13. As shown in FIG. 3, the attachment arms 14 have respective through holes 14a in which rubber bushings 15 are fitted with collars 16 fitted respectively therein.

The collars 16 have front ends held against upper and lower surfaces of brackets 21 depending from a rear vehicle frame portion. Bolts 18 extend forwardly through the collars 16, respectively, and nuts 19 are tightened on the front ends of the bolts 18 which project forwardly from the brackets 21.

The rear wheel steering gear box 11 thus attached to the brackets 21 are therefore allowed to be tilted around the rack shaft 13 due to the flexibility of the rubber bushings 15.

Since the linkage shaft 6 and the rotation input pinion shaft 12 are interconnected at the angle α as viewed in side elevation, and also since the rear wheel steering gear box 11 is tiltable around the rack shaft 13, changes in the distance L between the front and rear wheel steering gear boxes 1, 11, due to manufacturing or assembling errors of the shafts 4, 6, 12 and axial displacements of the these shafts while the motor vehicle is running, can be sufficiently absorbed by tilting movement of the gear box 11 around the rack shaft 13 as indicated by the imaginary lines in FIG. 4. As also shown in FIG. 4, the linkage shaft 6 is swingable with respect to the pinion shaft 4 and universal joint 5, and will have an orientation corresponding to the orientation of gear box 11.

Figure 5:
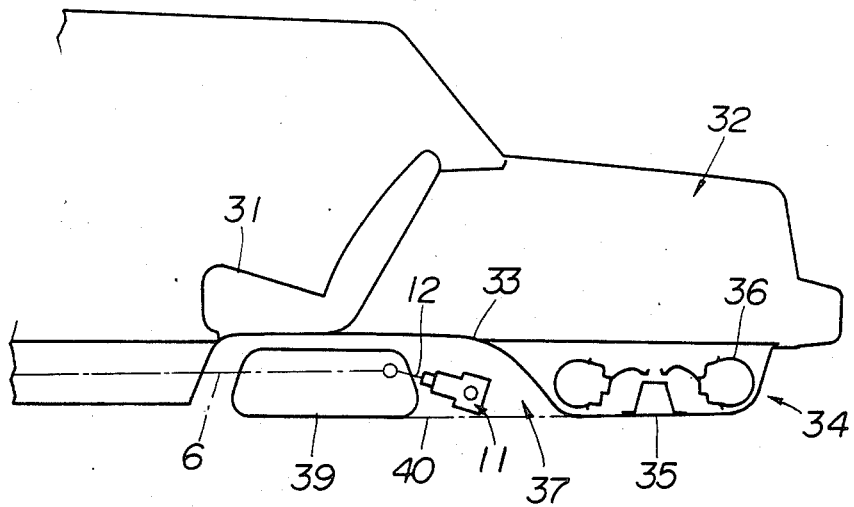
FIG. 5 is a schematic side elevational view showing the relationship between a rear seat, a fuel tank, a trunk bottom plate, and the rear wheel steering gear box in the rear portion of a motor vehicle incorporating the steering device of the present invention.

As illustrated in FIG. 5, a fuel tank 39 extending transversely of the motor vehicle frame is located between a position underneath a rear seat 31 and a position underneath a front portion of a bottom plate 33 of a trunk 32. A housing 34 for storing a spare tire 36 is defined in central and rear portions of the bottom plate 33 and positioned centrally in the transverse direction of the motor vehicle frame. The housing 34 is formed by a downwardly bulging portion of the bottom plate 33 and has a flat bottom surface 35 lower than the other portion of the bottom plate 33 for supporting the spare tire 34 thereon. A space 37 is defined between the spare tire housing 34 and the fuel tank 39. The rear wheel steering gear box 11 is disposed in the space 37 centrally in the transverse direction of the motor vehicle frame, and upwardly of the level 40 of the lower surface of the fuel tank 39 and the flat surface 35 of the housing 34.

The rear wheel steering gear box 11 housed in the space 37 is protected from road bumps by the fuel tank 39 when the motor vehicle moves forwards, and also by the spare tire housing 34 when the motor vehicle moves backwards. The fuel tank 39 and the spare tire housing 34 thus serve as guards for the steering gear box 11.

The steering gear box 11 may be installed on the motor vehicle frame by any suitable means, rather than by the illustrated attachment structure. Similarly, the rear wheel steering gear box could be of any suitable type other than the illustrated rack and pinion structure.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A steering device for steering front and rear wheels of a motor vehicle having a vehicle frame, comprising:
    a first steering gear box disposed in a front portion of the vehicle frame and including a linearly movable rack shaft operatively coupled to the front wheels, a first input shaft for moving said rack shaft, and an output shaft rotatable by movement of said rack shaft;
    a second steering gear box disposed in a rear portion of the vehicle frame and including a linearly movable connecting shaft operatively coupled to the rear wheels, and a second input shaft rotatable by said output shaft for moving said connecting shaft;
    a linkage shaft interconnecting said output shaft and said second input shaft and swingably coupled to said output shaft, said second input shaft being coupled to said linkage shaft at an angle with respect thereto as viewed in side elevation; and
    said second steering gear box being supported on the vehicle frame for tilting movement around said connecting shaft.

2. A steering device according to claim 1, wherein said second input shaft has a first end coupled to said linkage shaft and a second end inserted into said second steering gear box, said second input shaft being inclined with said second end directed downwardly.

3. A steering device according to claim 1, wherein said second steering gear box has a housing accommodating therein at least a portion of said second input shaft and at least a portion of said connecting shaft, said housing having at least one attachment member for attachment to the vehicle frame, said attachment member being attached to the vehicle frame through resilient means for resiliently allowing said second steering gear box to be tilted around said connecting shaft.

4. A steering device according to claim 3, wherein said attachment member extends radially outwardly of said connecting shaft.

5. A steering device according to claim 1, wherein said motor vehicle further includes a trunk disposed in the rear portion of the vehicle frame and having a bottom plate including a downwardly bulging portion having a flat surface at a level lower than the other portion of said bottom plate for supporting a spare tire thereon, said second steering gear box being disposed forwardly of said downwardly bulging portion and upwardly of the level of said flat surface.

6. A steering device according to claim 5, wherein said motor vehicle further includes a fuel tank disposed below the level of said other portion of the bottom plate and forwardly of said downwardly bulging portion, said second steering gear box being disposed between said fuel tank and said downwardly bulging portion.

* * * * *

UNITED STATES PATENT AND TRADEMARK OFFICE
CERTIFICATE OF CORRECTION

PATENT NO. : 4,706,977

DATED : November 17, 1987

INVENTOR(S) : Ukai et al.

It is certified that error appears in the above-identified patent and that said Letters Patent is hereby corrected as shown below:

```
Column 2, line 32, change "sheel" to --wheel--;
          line 45, after "ing" change "11" to --11a--.
Column 3, line 6, change "are" to --is--;
          line 16, after "of" delete "the".
```

Signed and Sealed this

Twenty-fourth Day of May, 1988

Attest:

DONALD J. QUIGG

*Attesting Officer*      *Commissioner of Patents and Trademarks*